(12) United States Patent
Kamba

(10) Patent No.: US 12,434,644 B2
(45) Date of Patent: Oct. 7, 2025

(54) HANDLING MACHINE AND METHOD FOR MANAGING BATTERY CHARGE

(71) Applicant: MANITOU BF, Ancenis (FR)

(72) Inventor: Elie Kamba, Ancenis (FR)

(73) Assignee: MANITOU BF, Ancenis (FR)

( * ) Notice: Subject to any disclaimer, the term of this patent is extended or adjusted under 35 U.S.C. 154(b) by 69 days.

(21) Appl. No.: 18/246,621

(22) PCT Filed: Sep. 29, 2021

(86) PCT No.: PCT/FR2021/051688
§ 371 (c)(1),
(2) Date: Mar. 24, 2023

(87) PCT Pub. No.: WO2022/069837
PCT Pub. Date: Apr. 7, 2022

(65) Prior Publication Data
US 2023/0365082 A1 Nov. 16, 2023

(30) Foreign Application Priority Data
Sep. 29, 2020 (FR) ..................................... 2009922

(51) Int. Cl.
*B60R 16/033* (2006.01)
*B60W 10/24* (2006.01)
(Continued)

(52) U.S. Cl.
CPC ........... *B60R 16/033* (2013.01); *B60W 10/24* (2013.01); *B60W 10/30* (2013.01); *B66F 9/24* (2013.01)

(58) Field of Classification Search
CPC ..... B60R 16/033; B60W 10/24; B60W 10/30; B66F 9/24
See application file for complete search history.

(56) References Cited

U.S. PATENT DOCUMENTS 5,850,209 A * 12/1998 Lemke .................. G06F 1/1601
345/169
11,479,142 B1 * 10/2022 Govan .................... B60L 53/62
(Continued)

FOREIGN PATENT DOCUMENTS

| CN | 111409504 | 7/2020 |
| EP | 2196350 | 6/2010 |
| EP | 3342623 | 7/2018 |

OTHER PUBLICATIONS

International Search Report and Written Opinion dated Jan. 31, 2022 for international PCT patent No. PCT/FR2021/051688.

*Primary Examiner* — Naeem Taslim Alam
(74) *Attorney, Agent, or Firm* — Husch Blackwell LLP

(57) ABSTRACT

A handling machine is disclosed. The handling machine includes a battery for powering a variator control system, a processing unit for controlling the variator control system, a voltage converter, a battery cut-off device, a start-up device, and an electrical charger. The handling machine further includes an opening and closing device controllable by the processing unit. The processing unit is connected to the battery and to the voltage converter. The controllable opening and closing device is connected to the battery and to the voltage converter. When the controllable opening and closing device is in a closed state and one or more of the start-up device and the battery cut-off device are in an open state, the processing unit is powered via the voltage converter.

19 Claims, 12 Drawing Sheets

(51) Int. Cl.
B60W 10/30 (2006.01)
B66F 9/24 (2006.01)

(56) References Cited

U.S. PATENT DOCUMENTS

| | | | |
|---|---|---|---|
| 2003/0117113 A1* | 6/2003 | Takemasa | B60L 58/10 |
| | | | 903/903 |
| 2005/0052080 A1* | 3/2005 | Maslov | H02K 16/04 |
| | | | 307/10.1 |
| 2011/0276448 A1* | 11/2011 | Perper | G06Q 30/04 |
| | | | 340/455 |
| 2012/0286575 A1 | 11/2012 | Jae-Dong | |
| 2014/0015456 A1* | 1/2014 | Nishio | B60L 7/14 |
| | | | 320/109 |
| 2015/0052390 A1* | 2/2015 | Dryer | G06F 1/30 |
| | | | 714/14 |
| 2017/0025877 A1* | 1/2017 | Xintian | H02J 7/0068 |
| 2017/0106899 A1* | 4/2017 | Xu | B60L 1/003 |
| 2017/0163064 A1* | 6/2017 | Liu | B60L 58/10 |
| 2017/0342685 A1* | 11/2017 | Kondo | E02F 9/2292 |
| 2018/0339596 A1* | 11/2018 | Ulrich | B60L 53/16 |
| 2019/0067957 A1* | 2/2019 | Yeom | B60L 53/66 |
| 2019/0131803 A1* | 5/2019 | Cong | H02J 7/00712 |
| 2020/0148136 A1* | 5/2020 | Takei | B60W 40/08 |
| 2020/0361341 A1* | 11/2020 | Kritzmacher | G07C 5/0816 |
| 2021/0082617 A1* | 3/2021 | Varghese | H02J 50/005 |
| 2021/0155100 A1* | 5/2021 | Khaligh | B60L 55/00 |
| 2022/0289051 A1* | 9/2022 | Huang | H01R 13/70 |
| 2022/0393573 A1* | 12/2022 | Pfeilschifter | B60L 3/003 |
| 2023/0111470 A1* | 4/2023 | Su | H02J 7/0034 |
| | | | 320/136 |
| 2023/0343534 A1* | 10/2023 | Kim | H01M 10/42 |

\* cited by examiner

HANDLING MACHINE AND METHOD FOR MANAGING BATTERY CHARGE

TECHNOLOGY FIELD OF THE INVENTION

The present disclosure relates generally to the charging of the batteries of electric or hybrid handling machines.

PRIOR ART

From the state of the art, electric handling machines, of aerial lift type, are known which comprise a charger that makes it possible, when the charger is connected to an electrical power supply network, to recharge the battery of the handling machine. The handling machine comprises a processing unit, also called computer, which makes it possible to perform data processing and machine electrical member control operations.

However, the connection of the charger to an electrical power supply network results in an abrupt cutting of the power supply to the computer, which can lead to malfunctions and/or losses of information, in particular when the computer is in the process of performing processing operations when the cutting of the computer power supply occurs.

Furthermore, users sometimes do not observe the requisite battery charging process, which is generally described in the instruction manual of the machine. Now, failure to observe the battery charge setpoints causes the life of the battery to be greatly reduced.

The owner, being unaware of a possible failure of the user to observe the charge setpoints, must then prematurely replace the battery, thus resulting in additional expenditures without being able to pass these additional costs onto the user or users who have not observed the charge setpoints.

Moreover, when a battery is charged, the user generally has only a very limited quantity of information relating to the charge, such that he or she is not necessarily aware of failure to observe the charge setpoints. Indeed, the charger normally has an LED indicator which allows him or her to be informed simply of the "charging" or "charging finished" state of the battery.

The document CN111409504 describes a battery block control system.

The aim of the present disclosure is to propose a novel handling machine and a corresponding method that make it possible to mitigate all or some of the problems set out above.

SUMMARY

The subject of the disclosure is a handling machine, such as an aerial lift, comprising:
- a variable speed drive control system making it possible to control at least one variable speed drive of an electric motor of the handling machine, such as a variable speed drive of a hydraulic pump electric motor or a variable speed drive of an electric motor for moving the machine around with respect to the ground;
- a battery making it possible to power said variable speed drive control system;
- a processing unit making it possible to drive the variable speed drive control system;
- a voltage converter making it possible to convert the voltage of the battery, said processing unit being connected to said voltage converter;
- a battery cut-off device, characterized in that the battery cut-off device is connected to the battery, on the one hand, and to the variable speed drive control system and to the voltage converter (possibly via the start-up device), on the other hand, by being configured to make it possible to close and open a battery power supply line of the variable speed drive control system and a battery power supply line of the voltage converter, the machine further comprising:
- a start-up device, capable of having a closed state and an open state, which is connected to the voltage converter, and possibly to the battery cut-off device;
- a charger that can be connected to an electrical power supply network to be powered and make it possible to charge the battery;
- the handling device further comprising an opening and closing device that can be controlled by the processing unit,
- the controllable opening and closing device being connected to the battery and to the voltage converter to make it possible, when the controllable opening and closing device is in the closed state, to power the processing unit via the voltage converter, even when the start-up device and/or the battery cut-off device is open.

Also a subject of the disclosure is a handling machine, such as an aerial lift, comprising:
- a variable speed drive control system making it possible to control at least one variable speed drive of an electric motor of the handling machine, such as a variable speed drive of a hydraulic pump electric motor or a variable speed drive of an electric motor for moving the machine around with respect to the ground;
- a battery making it possible to power said variable speed drive control system;
- a processing unit making it possible to drive the variable speed drive control system;
- a voltage converter making it possible to convert the voltage of the battery, said processing unit being connected to said voltage converter;
- a battery cut-off device, capable of having a closed state and an open state, which is connected to the battery;
- a start-up device, capable of having a closed state and an open state, which is connected to the battery cut-off device and to the voltage converter;
- a charger that can be connected to an electrical power supply network to be powered and make it possible to charge the battery;
- the handling machine further comprising an opening and closing device that can be controlled by the processing unit;
- the controllable opening and closing device being connected to the battery and to the voltage converter to make it possible, when the controllable opening and closing device is in the closed state, to power the processing unit via the voltage converter, even when the start-up device and/or the battery cut-off device is open.

The controllable opening and closing device makes it possible, in a situation in which the machine is operational and in which the start-up device is brought from the closed state (ON position) to the open state (OFF position), and/or in which the battery cut-off device is brought from the closed state (ON position) to the open state (OFF position), for the electrical power supply of the processing unit of the machine to be maintained by virtue of the closed state of this controllable opening and closing device, such that the computer can continue to function in order to perform certain operations, notably data processing operations, for example to backup information and possibly command the display of information on a screen.

Such a design makes it possible to obtain maintenance of the power supply of the processing unit of the machine, and to do so as long as the processing unit does not command the opening of the controllable opening and closing device, while benefitting from low electrical consumption, which allows the processing unit to control the moment at which the power supply of the electronics system of the machine is switched off and thus ensure that the operations to be performed (such as current data processing, backups, display) are performed or completed.

It is thus possible to benefit from a backup of information before the machine is switched off.

According to a preferred embodiment, it is also possible to provide the user with information on the machine via a screen in order to inform him or her of the state of charge, of the disconnected state of the charger, or even a charge process recommendation.

The information backed up can be used by a third party, such as the owner of the machine, for example a machine leasing company, to determine if the battery was charged in the requisite conditions and, if not, make it possible to decide, on the basis of information backed up, to bill the user with penalties to take account of the premature ageing of the battery. Advantageously, such information is backed up in a memory of the processing unit, but, as a variant or in addition, it is possible to provide for this information to be transmitted to a remote server or terminal.

By virtue of the presence of the controllable opening and closing device which makes it possible to maintain the power supply of the processing unit despite the battery cut-off device and/or the start-up device being in an open state, the processing unit of the machine is able to terminate operations and to backup information such as information relating to battery charge management and in particular to the conditions in which the battery was charged.

As recalled above, provision can be made for all or part of this information to be able to be transmitted to a remote server and/or to be remotely accessible, for example by the owner of the machine. All or part of this information can also be displayed on the screen to inform the user.

The presence of a screen and the maintaining of the powering of the processing unit, even if the charger power supply is cut (as long as the processing unit does not command the opening of the controllable opening and closing device), and when the battery cut-off device and/or the start-up device is open, makes it possible to display recommendations on the screen to guide the user. In particular, if the user has erroneously disconnected the charger, the processing unit can command the display on the screen of a message prompting the user to reconnect the charger, for example before a given time has elapsed, to be able to resume the battery charging process with a reduced risk of damage.

Provision can be made, in the event of untimely disconnection of the battery, or in the event of discharging of the battery under certain threshold, for corresponding information to be displayed on the screen to alert the user and, in parallel, for the corresponding information to be saved.

According to one embodiment, when the operator connects the charger while the battery cut-off device and/or the start-up device is in the closed position (ON), the processing unit is configured to not authorize the charge, but preferably perform at least one operation preparatory to switching off the processing unit, and, in order to authorize the charging of the battery by the charger, the processing unit emits a signal to request, for example via a display screen, the operator to set the battery cut-off device and/or the start-up device to the open position (OFF).

Conversely, with the handling machines of the state of the art, because the connection of the charger to the electrical power supply network leads to the complete shutdown of the machine, and in particular the abrupt stopping of the processing unit power supply, it is not possible to store in the machine information relating to the manner in which the battery was recharged.

The handling machine can also comprise one or more of the following features, taken in any technically admissible combination.

According to one embodiment of the disclosure, the processing unit is configured to, when the processing unit is powered by the converter and the start-up device and/or the battery cut-off device switches from a closed position to an open position, perform at least one operation preparatory to switching off the processing unit.

According to one embodiment of the disclosure, the charger includes a first controllable opening and closing system configured to have an open state when the charger is not electrically powered and a closed state when the charger is in the powered state, said first controllable opening and closing system being connected to the battery and to the voltage converter, to make it possible, when the charger is in the powered state, for the battery to power the converter via the controllable opening and closing system of the charger for the converter to be able to power the processing unit which commands the closing of the controllable opening and closing device.

According to one embodiment of the disclosure, the processing unit is configured to, when at least one, preferably each, of the battery cut-off device and the start-up device is open, and the charger is powered, generate a signal authorizing the charging of the battery by the charger.

According to one embodiment of the disclosure, the processing unit is configured to detect if the charger is no longer powered, and, when it has been detected that the charger is no longer powered:
execute at least one operation preparatory to switching off the processing unit, and
open the controllable opening and closing device.

According to one embodiment of the disclosure, the processing unit is configured to not operate the variable speed drive control system when the charger is powered.

According to one embodiment of the disclosure, said at least one operation preparatory to switching off the processing unit comprises an operation of backing up information relating to a cutting of the charger power supply.

According to one embodiment of the disclosure, said at least one operation preparatory to switching off the processing unit comprises the display on the screen of information relating to a cutting of the charger power supply.

According to one embodiment of the disclosure, the battery cut-off device comprises a switch system capable of having an open state and a closed state, said switch system having a terminal connected to the battery and another terminal connected to a power supply input of the variable speed drive control system to make it possible to power the variable speed drive control system.

According to one embodiment of the disclosure, the battery cut-off device comprises a switch system capable of having an open state and a closed state, said switch system having a terminal connected to the battery and another terminal connected to a power supply input of the variable speed drive control system and to an input of the voltage converter to make it possible to power the variable speed drive control system and the voltage converter when the switch system is in the closed state and to make it possible to cut the power supply of the control system and open the battery power supply line of the voltage converter when the switch system is in the open state.

According to one embodiment of the disclosure, the start-up device comprises a switch system capable of having an open state and a closed state, said switch system having a terminal connected to a terminal of the switch system of the battery cut-off device, and another terminal connected to an input of the voltage converter. According to another embodiment it is possible to provide for the start-up device not to be connected to the power supply line from the battery which passes through the battery cut-off device, but for the start-up device to be situated on one or more output lines of the converter.

According to an embodiment of the disclosure, at least one, preferably each, of the battery cut-off device and the start-up device comprises another switch system capable of having an open state and a closed state, and of which a terminal is connected to a terminal of the processing unit to allow the processing unit to detect the closed or open state of at least one, preferably each, of the battery cut-off device and the start-up device.

According to an embodiment of the disclosure, the machine comprises a display screen that can be driven by the processing unit.

According to an embodiment of the disclosure, the charger comprises a second controllable opening and closing system configured to have an open state in the absence of powering of the charger by the electrical power supply network and a closed state when the charger is in the powered state, the second controllable opening and closing system comprising a terminal connected to an output of the voltage converter and a terminal connected to a terminal of the processing unit to make it possible to detect if the charger is powered.

According to an embodiment of the disclosure, the charger comprises a processing unit configured to, when the charger is in the powered state, automatically command the closing of each of the first and second controllable opening and closing systems of the charger, the controllable opening and closing systems being configured to revert to the open position when the charger is in the non-powered state.

The disclosure relates also to a method for managing the charge of a battery of a handling machine in accordance with any one of the embodiments presented above, said method comprising the following steps, which are executed by the processing unit:
- an operator connects a plug of the charger to an electrical power supply network to power said charger;
- the processing unit is started up;
- the processing unit commands the closing of the controllable opening and closing device;
- the charger performs the battery charging operation;
- the processing unit detects the fact that the charger is no longer powered;
- the processing unit executes at least one operation preparatory to switching off the processing unit, and
- the processing unit commands the opening of the controllable opening and closing device.

BRIEF DESCRIPTION OF THE DRAWINGS

Other features and advantages of the disclosure will emerge more from the following description, which is purely illustrative and nonlimiting and should be read in light of the attached drawings, in which.

DETAILED DESCRIPTION

Figure 1:
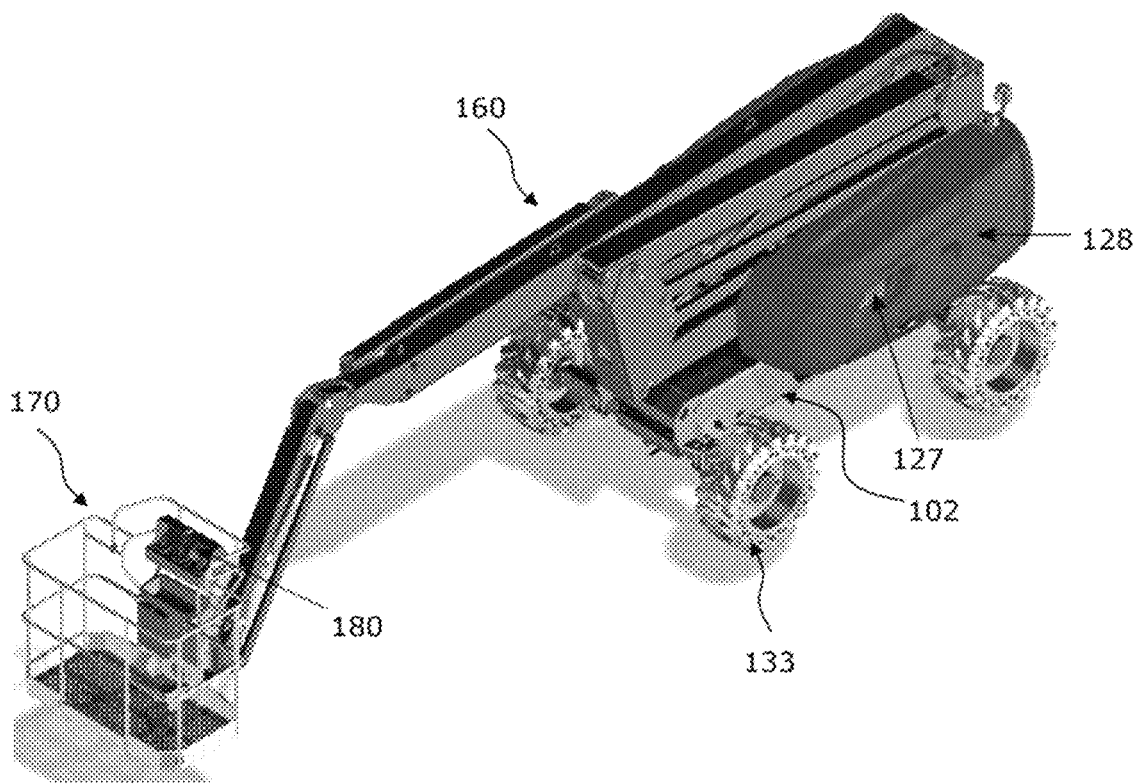
FIG. 1 is a perspective view of a handling machine according to an embodiment of the disclosure.

The concept of the disclosure is described more fully hereinbelow with reference to the attached drawings, in which embodiments of the concept of the disclosure are shown. In the drawings, the relative size and sizes of the elements can be exaggerated for the purposes of clarity. Similar numbers refer to similar elements throughout the drawings. However, this concept of the disclosure can be implemented in many different forms and should not be interpreted as being limited to the embodiments set out here. Instead of that, these embodiments are proposed in such a way that this description is complete, and communicate the extent of the concept of the disclosure to the persons skilled in the art.

A reference throughout the specification to "an embodiment" means that a functionality, a structure, or a particular feature described in relation to an embodiment is included in at least one embodiment of the present disclosure. Thus, the appearance of the expression "in an embodiment" in various places throughout the specification does not necessarily refer to the same embodiment. Furthermore, the functionalities, the structures, or the particular features can be combined in any appropriate manner in one or more embodiments.

The disclosure relates to a handling machine. The handling machine can be electric as in the example detailed hereinbelow, or hybrid.

In the example illustrated in FIG. 1, the handling machine is an electric lift allowing a person to work at height. This lift comprises a rolling chassis 102, and a lift arm 160 provided at its end with a platform 170 (also called basket) as explained hereinbelow.

As a variant, the handling machine can be of another type such as a reach truck or a fork-lift truck, for example with telescopic arms. Thus, the description which follows is given in the case of a lift but applies also to other types of handling machines.

Motorized Movement System

The lift comprises a motorized system for moving the machine around. In the example represented, the chassis 102 is equipped with four wheels 133, of which at least two are generally drive wheels.

The motorized system for moving the machine around comprises an electric motor, called translation motor, associated with a power variable speed drive 104 (schematically represented in FIG. 3) which is controlled by a variable speed drive control system 7 presented hereinbelow. The motorized system for moving around also comprises a transmission system from the motor to the wheels 133 of the machine and a steering control system making it possible to move the machine around on the ground.

Platform

As recalled above, the lift comprises a platform 170 on which the operator wanting to work at height can stand. This platform 170, which comprises a floor and a guard rail surrounding the floor, is provided with a control console 180 equipped with control member(s) as is known per se. This control console forms a high control station situated in the basket of the lift.

The lift comprises means for elevating the platform with respect to the chassis 102. These elevation means comprise lift arms 160 disposed between a zone of connection to the platform 170 and the chassis 102. This lift arm 160 can be formed by one or more arm sections that are articulated to one another as in the example represented. This arm can be a telescopic or non-telescopic arm.

For the transition of the arm from the low position to the high position, the lift comprises a hydraulic pump, called lift pump, which comprises an electric motor associated with a power variable speed drive 105 (schematically represented in FIG. 3) which is controlled by the variable speed drive control system 7. The lift also comprises hydraulic actuators, in this case cylinders, disposed between the arm and the chassis, and between the arm sections when the arm is in different sections.

These cylinders are supplied with hydraulic fluid using the hydraulic pump via a hydraulic distributor, the movement of which is controlled using signals supplied from a processing unit 5 (also called drive unit or computer), described hereinbelow.

The low position of the arm, in which the arm is lowered to the maximum and folded down, and in which the platform 170 is situated in proximity to the ground, is called the lift transport configuration, while the high position of the arm, in which the lift arm 160 is deployed and the platform 170 is away from the ground, is called the lift working configuration.

Advantageously, the lift comprises, in addition to the control console 180, a control station 127 mounted on the chassis and called ground control station 127. In the representation of FIG. 1, a cowl 128 protects this control station. This second control station 127 makes it possible to take over from an operator in difficulty on the platform and perform operations on the lift without having to climb up onto the platform 180. The low control station 127 makes it possible to control in particular the movements of the arm and of the basket for an operator situated on the ground (unlike an operator situated in the basket of the lift).

Processing Unit

The lift comprises a processing unit 5. Said processing unit 5 takes the form of an electronic and computing system which comprises a processor, such as a microprocessor or microcontroller.

The processing unit 5 is connected to a voltage converter 4, presented hereinbelow, to make it possible to power the unit 5, preferably at 12 volts, with an appropriate voltage lower than that of the battery (the greater voltage of which makes it possible to power one or more electric motor variable speed drives).

The processing unit 5 thus makes it possible to control, via the variable speed drive control system 7, to which the processing unit 5 is connected, the operation of the variable speed drive or drives of the translation motor and of the lift pump motor, as a function of the data supplied by high control console 180 and/or the low control console 127. The processing unit 5 also makes it possible to control other components 106, such as solenoid valves.

Control System

As described above, the handling machine comprises a variable speed drive control system 7 making it possible to control the power variable speed drives 104, 105.

In the example illustrated in the figures, the variable speed drive control system 7 is powered with a voltage corresponding to that of the battery 1 and is driven by the processing unit 5 which is powered with a lower voltage supplied by the voltage converter 4.

Power Supply

Figure 3:
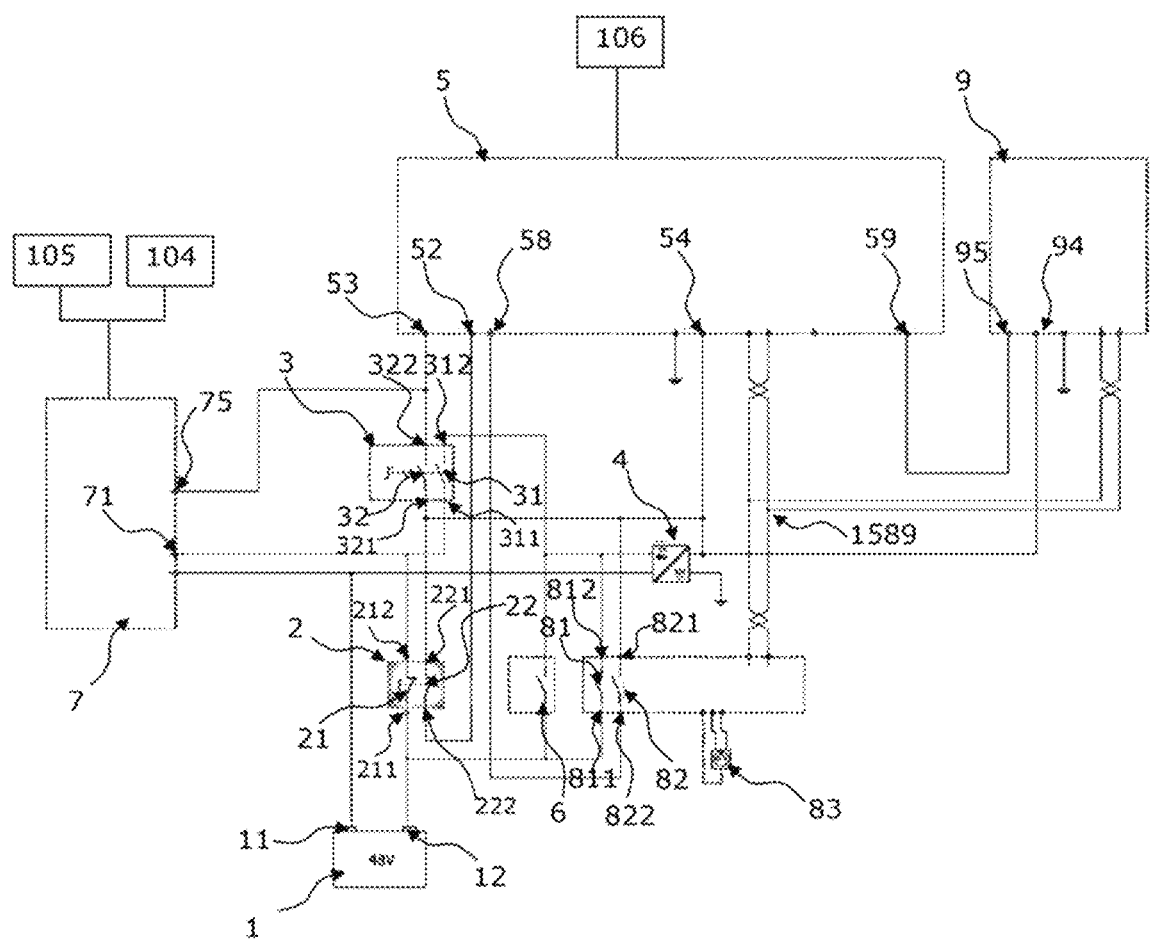
FIG. 3 is a diagram of an electronic system showing the wiring of several electrical and/or electronic elements of a handling machine according to an embodiment of the disclosure.

As illustrated in the diagram of the electronic system of the machine in FIG. 3, a battery 1 makes it possible to electrically power the variable speed drive control system 7. In practice, the battery 1 can be formed by two 24 volt packets to obtain a 48 volt battery, and thus be able to power said variable speed drive control system 7.

As described above, the voltage converter 4 is used to convert the voltage of the battery 1 into a voltage suited to the operation of certain components, such as the processing unit 5 which is powered with a voltage lower than that delivered by the battery 1, and preferably a screen 9 as explained hereinbelow.

In the embodiment illustrated in the figures, the converter 4 is of 48 volt/12 volt type.

The battery 1 thus makes it possible to power at least one electric motor variable speed drive by the variable speed drive control system 7, and, via the voltage converter 4, power the processing unit 5 and, preferably, a screen 9.

According to a particular aspect, the battery 1 is a lead-acid battery.

Safety and Start-Up System

The handling machine comprises a safety and start-up system. In the example of the lift illustrated in the figures, this safety and start-up system is included in the low control station 127 of the lift.

The safety and start-up system comprises a battery cut-off device 2, which is connected to the battery 1, to make it possible, in the open position, to isolate components, and in particular the variable speed drive control system 7, with respect to the battery 1 whereas, in the closed position, the battery cut-off device 2 makes it possible to power up the variable speed drive control system 7.

The safety and start-up system also comprises a start-up device 3 which is connected to the battery cut-off device 2 and to the voltage converter 4. In the example illustrated in FIG. 2, the start-up device 3 takes the form of a member that can be manually actuated such as a key/rotary knob that the operator can actuate (turn) between:

a start-up position or closed position (active state) in which it closes an electrical line between the battery cut-off device 2 and the converter 4 to allow the converter 4 to be powered by the battery 1 via the battery cut-off device 2 and the start-up device 3 (when the battery cut-off device 2 is closed), an off position or open position (inactive state) in which it opens the electrical circuit between the battery cut-off device 2 and the converter 4.

The battery cut-off device 2 can be manually actuated by the operator.

As can be seen in FIGS. 3 to 12, the battery cut-off device 2 comprises a switch system 21 capable of having an open state and a closed state. Said switch system 21 has a terminal 211 connected to the battery 1 and another terminal 212 connected to a power supply input 71 of the variable speed drive control system 7 to make it possible to power this control system 7 via the battery 1 when the switch system 21 is in the closed state.

The start-up device 3 comprises a switch system 31 which has a terminal 311 connected to the terminal 212 of the switch system 21 of the battery 1 and another terminal 312 connected to the output of the converter 4.

In a variant of the example illustrated in the figures, provision can be made for the start-up device 3 to be situated only on the output voltage network (12 volt) of the converter 4 and not on the higher voltage network (48 volt) of the battery 1. In this variant (not illustrated), the power supply line (at 48 volts) of the converter 4 which passes through the switch system 21 of the device 2, bypasses the start-up device 3.

Furthermore, each of the battery cut-off and start-up devices 2, 3 comprises a switch system 22, 32 capable of having an open state and a closed state, making it possible for the processing unit 5 to detect the closed or open state of the corresponding device 2, 3.

Thus, the closed position of the start-up device 3 also closes a switch system 32, which closes an electrical line between a terminal 53 of the processing unit and the output of the converter 4 to allow the processing unit 5 to detect the closed state of the start-up device. Conversely, the processing unit 5 can detect the open state of the start-up device 3.

Similarly, the closed position of the battery cut-off device 2 causes the switch system 22 to switch to the closed position, which closes the electrical line between a terminal 52 of the processing unit and the output of the converter 4 to allow the processing unit 5 to detect the closed state of the battery cut-off device 2. Conversely, the processing unit can detect the open state of the battery cut-off device 2. In particular as illustrated in FIG. 3, a terminal 222 of the switch system 22 is connected to a terminal 52 of the processing unit 5 and a terminal 322 of the switch system 32 is connected to a terminal 53 of the processing unit 5.

The start-up device 3 is configured for its position to bring the two switch systems 31, 32 into a same open or closed state. Thus, when the start-up device 3 is in the closed position, the two switch systems 31, 32 are closed, allowing the passage of current, and, conversely, when the start-up device is in the open position, the two switch systems 31, 32 are closed, preventing the passage of current.

Figure 2:
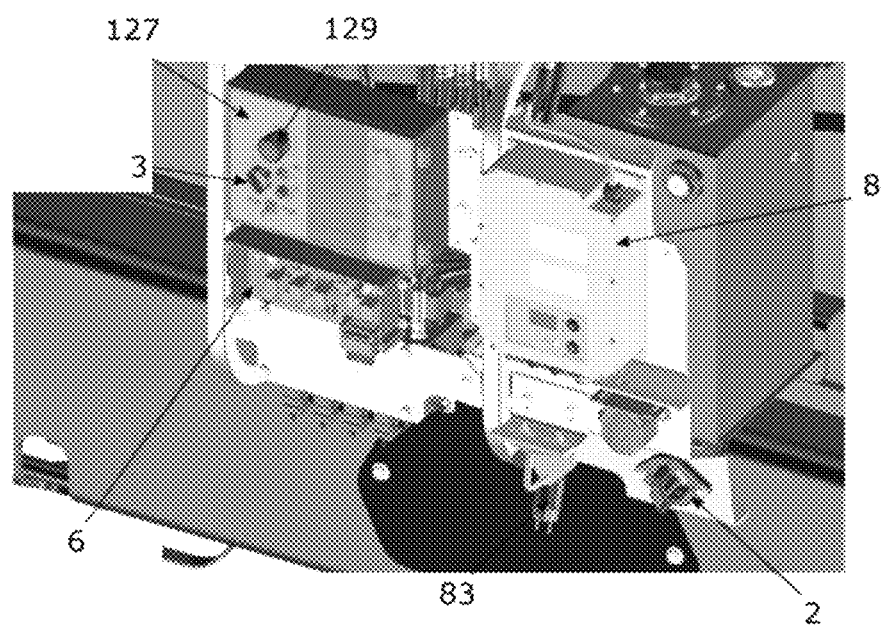
FIG. 2 is a view of a part of the machine of FIG. 1 with a protective cowl removed showing several elements of a machine safety and start-up system.

As can be seen in FIG. 2, an emergency stop button 129 is also provided.

Charger

The handling machine also comprises, preferably at the low control station 127, a charger 8 which can be connected by an electrical plug 83 to an electrical power supply network to allow the battery 1 to be charged. The charger also comprises a positive terminal connected to the positive terminal 12 of the battery and a negative terminal connected to the ground like the terminal 11 of the battery to be able to charge the battery when the processing unit 5 gives it the command to do so. This connection is not represented so as not to overload the figures.

The charger 8 includes a first (electrically or electronically) controllable opening and closing system 81 configured to have an open state in the absence of powering of the charger 8 by the electrical power supply network and a closed state when the charger 8 is in the powered state. Said first controllable opening and closing system 81 comprises a terminal 811 connected to the battery 1 and another terminal 812 connected to the voltage converter 4 (in particular between the controllable opening and closing device 6 and the input of the voltage converter 4).

The charger 8 comprises a second (electrically or electronically) controllable opening and closing system 82 configured also to have an open state in the absence of powering of the charger 8 by the electrical power supply network and a closed state when the charger 8 is in the powered stated.

The second controllable opening and closing system 81 comprises a terminal 821 connected to an output of the voltage converter 4 and a terminal 822 connected to a terminal 58 of the processing unit 5.

The charger 8 comprises a processing unit configured to, when the charger 8 is in the powered state, automatically command the closing of each of the first and second controllable opening and closing systems 81, 82 of the charger 8.

The connection of the second controllable opening and closing system 82 to the processing unit 5 thus makes it possible to detect if the charger 8 is powered by the processing unit 5 detecting a given voltage which corresponds to the output voltage of the converter 4 if the system 82 is closed.

The first system 81 and the second system 82 can each be produced in the form of a relay.

Controllable Opening and Closing Device

The handling machine further comprises an electronically or electrically controllable opening and closing device 6. The device 6 can be controlled by the processing unit 5. The connection between the unit 5 and the controllable opening and closing device 6 is not represented so as not to overload the figures. The controllable opening and closing device 6 can be produced in the form of a relay.

As illustrated in the figures, the controllable opening and closing device 6 is interposed between the positive terminal 12 of the battery 1 and the power supply input of the voltage converter 4. When the battery cut-off device 2 (in particular the switch system 21), the controllable opening and closing device 6, and the controllable opening and closing system 81 of the charger 8 are open, the elements of the circuit (notably the variable speed drive control system 7, the converter 4 and the processing unit 5) are isolated from the battery, which makes it possible to ensure electrical safety and not cause electrical consumption. In other words, when the battery cut-off device 2 (in particular the switch system 21), the controllable opening and closing device 6, and the controllable opening and closing system 81 of the charger 8 are in the open state, the corresponding power supply lines of the converter 4 which come from the battery 1 through the controllable opening and closing device 6, the battery cut-off device 2 and the charger 8 are open. Likewise, when the battery cut-off device 2 is in the open state, the power supply line of the variable speed drive control system 7 is open.

As can be seen in the figures, the processing unit 5 is not on the voltage network of the battery, that is to say it is not directly connected to the battery. In other words, the processing unit 5 is isolated from the battery. The voltage converter is interposed between the processing unit and the battery and the power supply line between the battery and the converter can be opened by the switch system 21 of the battery cut-off device 2.

In the document CN111409504, there is no provision to cut the power supply between the battery and the DC/DC voltage converter. It can be seen in the electrical diagram supplied in this document CN111409504 that the terminal λ+ of the converter remains connected to the positive pole of the battery. In the document CN111409504, the DC/DC voltage converter and all of the circuit remains powered, which poses problems of safety and of electrical consumption.

Figure 6:
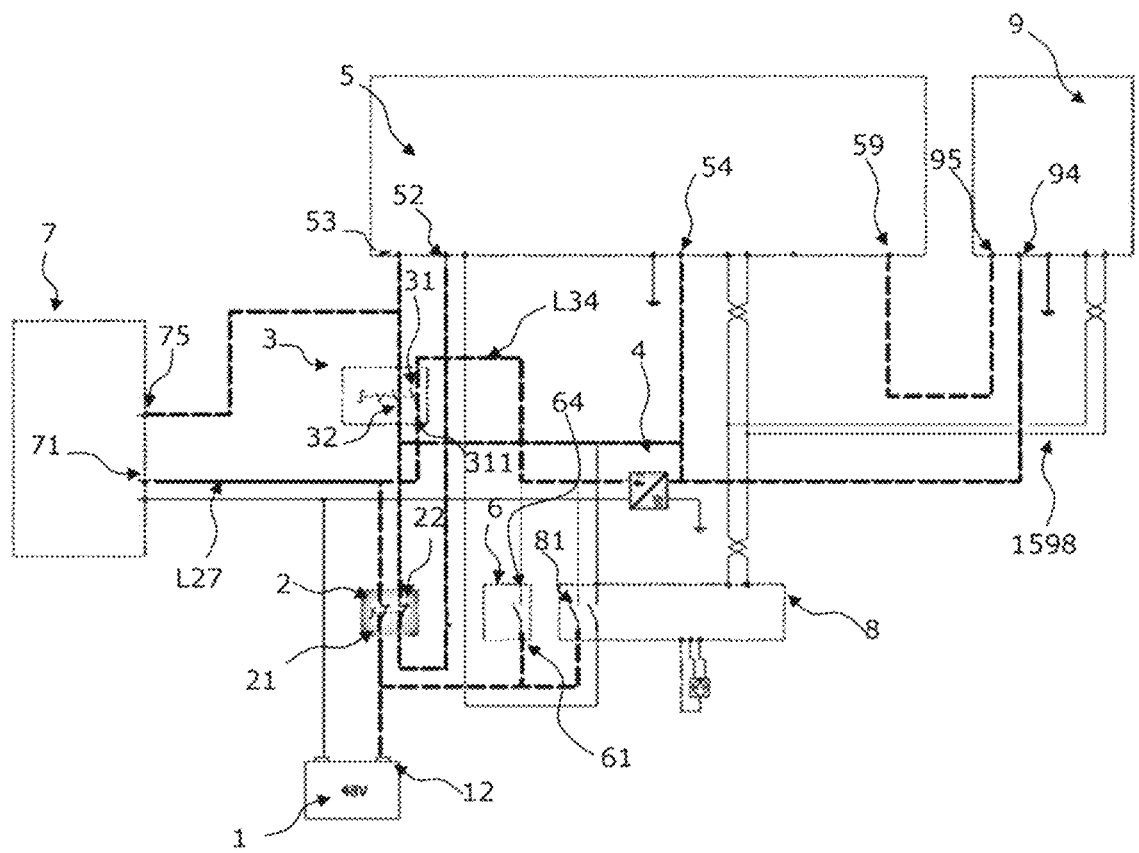
FIG. 6 illustrates a third state of operation of the electronic system of FIG. 3.
Figure 7:
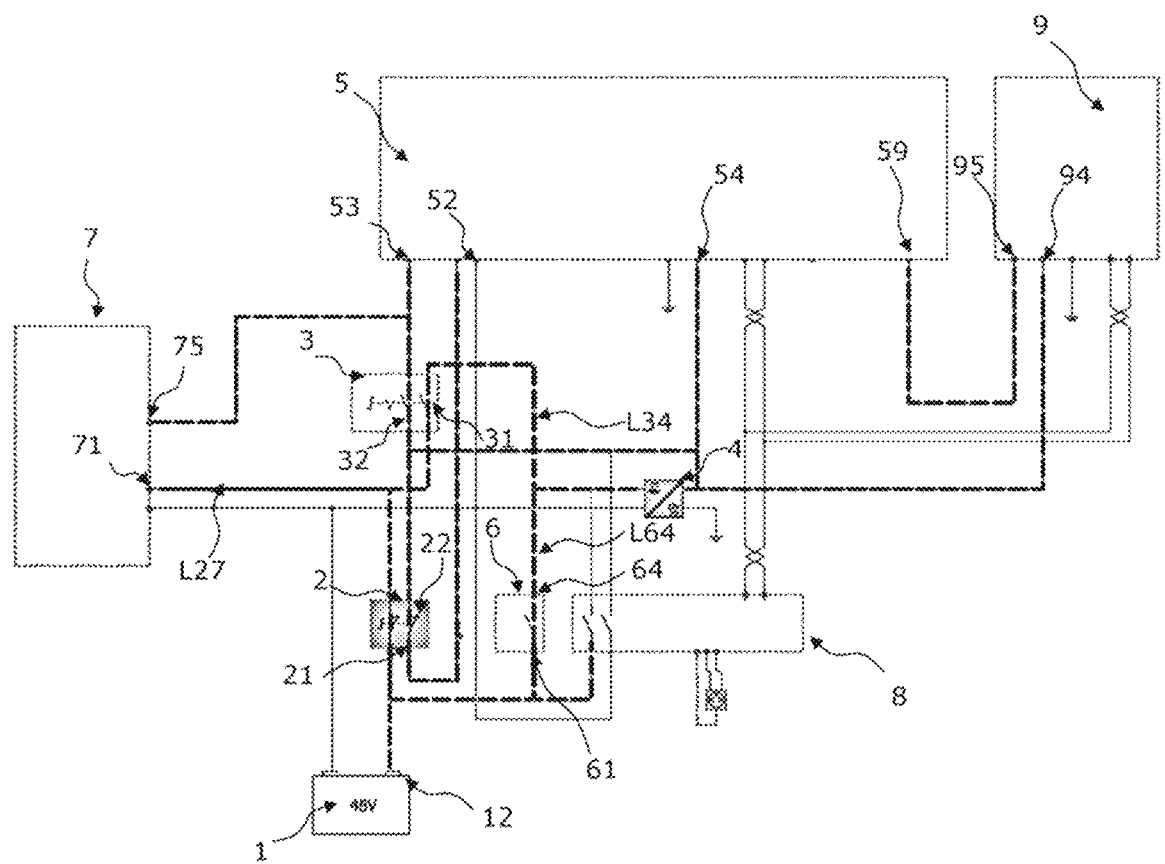
FIG. 7 illustrates a fourth state of operation of the electronic system of FIG. 3.

As illustrated more particularly in FIGS. 6 and 7, the controllable opening and closing device 6 is connected by its terminal 61 to the battery 1 and by its terminal 64 to the voltage converter 4 to make it possible, when the controllable opening and closing device 6 is in the closed state, for the processing unit 5 to be powered by the voltage converter 4, even when the start-up device 3 and/or the battery cut-off device 2 is open.

The controllable opening and closing device 6 is connected (by its terminal 61) to the positive pole of the battery upstream of the battery cut-off device 2, that is to say between the terminal 12 of the battery 1 and the terminal 211 of the switch system 21 of the battery cut-off device 2.

Preparation for Switching Off

As detailed hereinbelow, a processing unit 5 makes it possible to detect situations prior to a shutdown of operation of the machine and/or a disconnection of the charger and, in these situations, the controllable opening and closing device 6 being closed makes it possible to maintain the power supply for the processing unit 5 for the time it takes to execute at least one operation preparatory to switching off the processing unit 5 to avoid malfunctions and/or prevent data from being lost.

Once the operations preparatory to switching off have been performed, the processing unit 5 can command the opening of the controllable opening and closing device 6. Thus, once the process preparatory to the switching off has been completed, the processing unit 5 switches off cleanly.

The operation preparatory to switching off can include the storage of information relating to a cutting of the power supply of the charger 8, which can correspond to an event whereby the charger was disconnected.

The processing unit 5 is configured to prevent the charging of the battery 1 by the charger 8 when at least one out of the battery cut-off device 2 and the start-up device 3 is closed. Preferentially, the processing unit 5 is configured to allow the charging of the battery 1 only when the battery cut-off device 2 and the start-up device 3 are open, in order to avoid having the variable speed drive control system 7 of the machine remain powered up while the battery 1 is charging.

In particular, the prevention of charging of the battery 1 when the battery cut-off device 2 and/or the start-up device 3 is closed makes it possible to prevent an electrical malfunction from causing a motor associated with a variable speed drive controlled by the variable speed drive control system 7 to operate.

Display Screen

According to a preferred embodiment and as illustrated in FIGS. 3 to 12, the machine comprises a display screen 9 which is powered by the voltage converter 4 (which is illustrated by the terminal 94 of the screen connected to the output of the voltage converter 4), and which is connected to the processing unit 5 (which is illustrated by the terminal 95 of the screen connected to the terminal 59 of the unit 5) to allow the display screen 9 to be driven by said processing unit 5.

Thus, the preparation to switch off the processing unit 5 can comprise the display on the screen 9 of information relating to a cutting of the power supply of the charger 8.

A CAN communication bus, referenced 1589, links the charger 8, the processing unit 5 and the screen 9.

The processing unit 5, the converter 4, the control system 7 and the screen 9 each have a terminal for connection to the ground to which the negative terminal 11 of the battery 1 is also connected.

The functions and steps described in association with elements of the electronic system of the machine can be implemented in computer program form or via hardware components (e.g. programmable gate arrays). In particular, the functions and steps applied by the processing unit 5, the control system 7 and/or the charger 8 can be performed by instruction sets or computing modules implemented in a processor or controller or be produced by dedicated electronic components or components of FPGA or ASIC type. It is also possible to combine computing parts and electronic parts.

Different modes and states of operation of the electronic system of the handling machine are presented hereinbelow.

The different states of a so-called main, or off-load, mode of operation of the battery, in which charging of the battery does not take place, are first of all described with reference to FIGS. 3 to 9.

I. Off-Load Mode of Operation

Battery Cut-Off Device in the Open State

Figure 4:
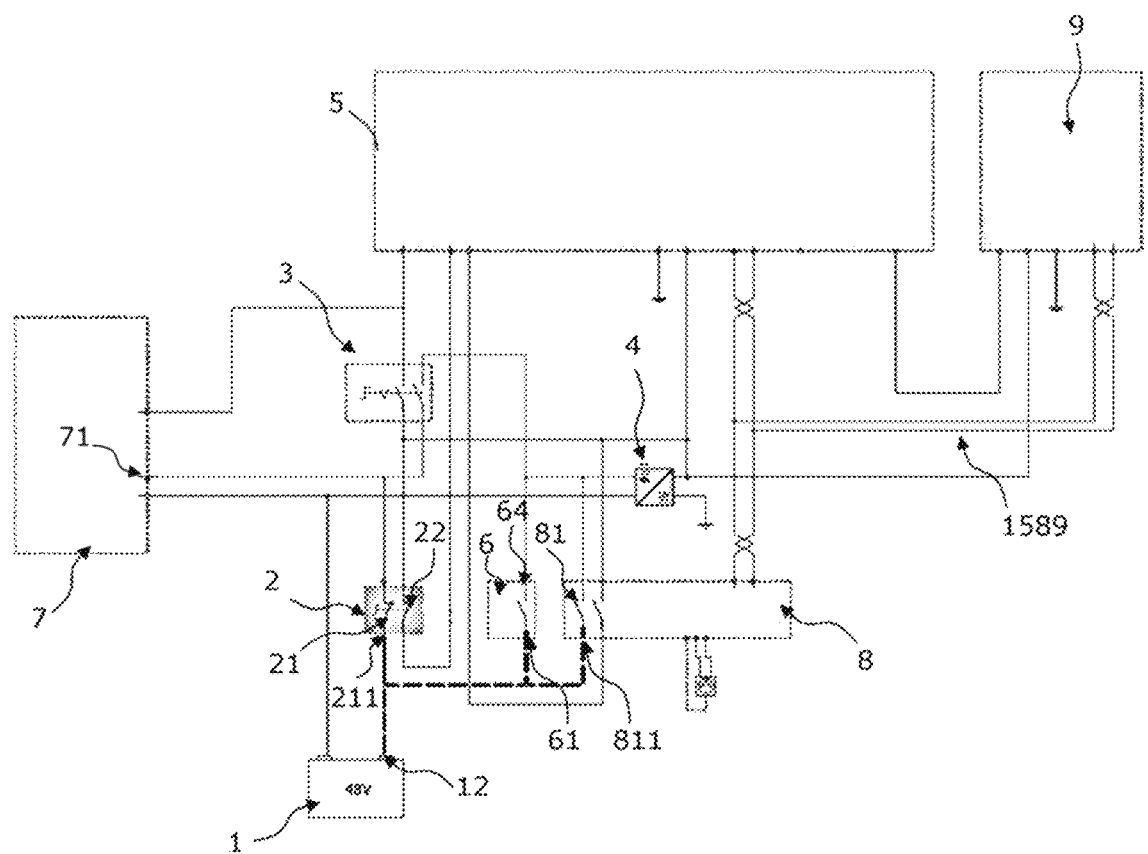
FIG. 4 illustrates a first state of operation of the electronic system of FIG. 3.

When the electronic system is in the configuration illustrated in FIG. 4, the battery cut-off device 2 is in the open state (OFF position). The start-up device 3 is also in the open state.

The controllable opening and closing device 6 is also in the open state. The terminal 211 of the battery cut-off device 2, the terminal 61 of the controllable opening and closing device 6 and the terminal 811 of the controllable opening and closing system 81 of the charger 8 are at the potential of the terminal 12 of the battery, as illustrated by the emboldened and broken corresponding lines in FIG. 4, but the opening of the controllable opening and closing device 6, of the switch system 21, and of the controllable opening and closing system 81 makes it possible to isolate in particular the processing unit 5 and the variable speed drive control system 7 with respect to the battery 1.

Closing of the Battery Cut-Off Device

Figure 5:
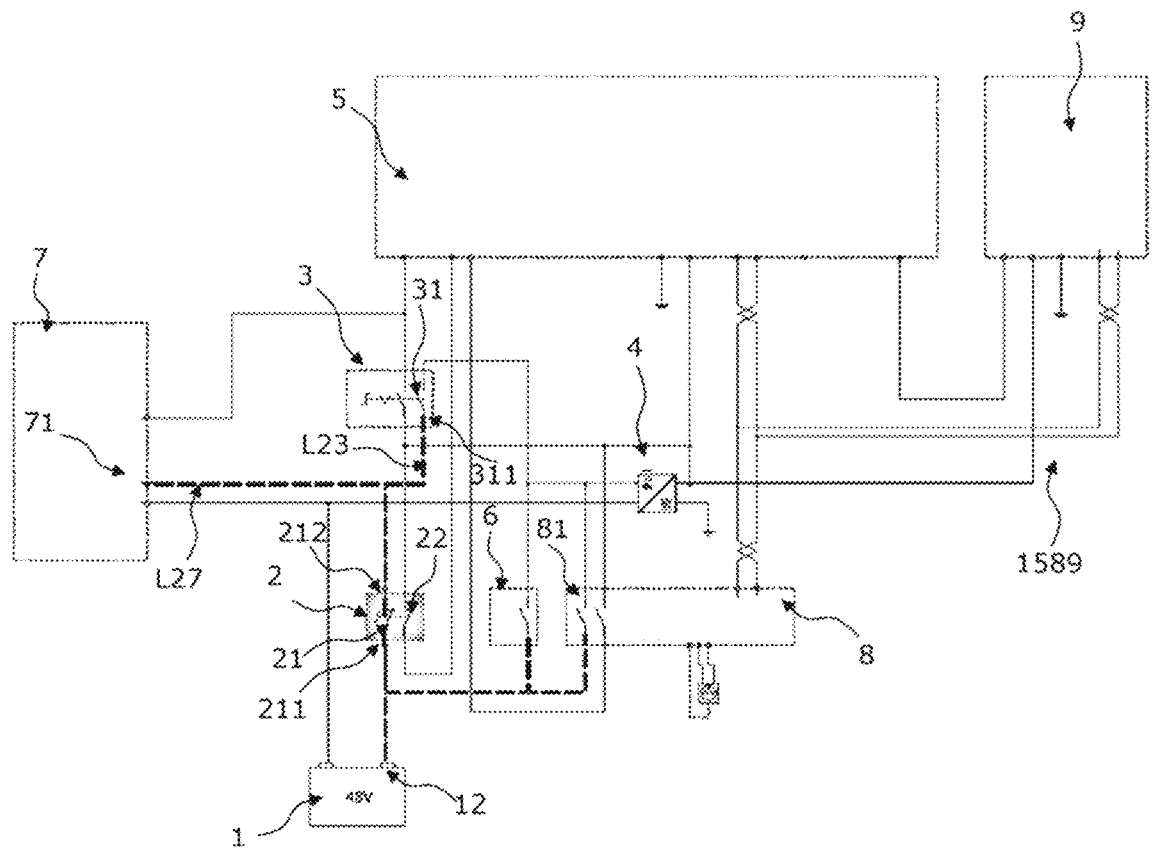
FIG. 5 illustrates a second state of operation of the electronic system of FIG. 3.

In the configuration illustrated in FIG. 5, the battery cut-off device 2 has been brought to the closed position (ON position). Thus, the closing of the switch system 21 of the battery cut-off device 2 makes it possible to power up the variable speed drive control system 7 by the battery 1 (at the power supply terminal 71 of the variable speed drive control system 7).

As schematically represented in FIG. 5 by emboldened and dotted lines, the power line L27 connected to the variable speed drive control system 7 and the power line L23 connected to the start-up device 3 (which is still open) are thus powered up via the battery cut-off device 2.

For all that, the processing unit 5 is not yet powered, and the variable speed drive control system 7, driven by the processing unit 5, cannot operate, since the start-up device 3 is still in the open state.

Closing of the Start-Up Device

In the configuration illustrated in FIG. 6, which follows the state of the electronic system described in FIG. 5, the start-up device 3 is brought into the closed position (ON position).

Thus, each of the switch systems 31, 32 switches to the closed position, such that the power line L23 connected to the terminal 311 can now power the line L34 which extends from the terminal 312 of the start-up device 3 to the converter 4, which allows the converter 4 to supply a suitable power supply voltage to the processing unit 5 which, as illustrated in FIG. 6, has a power supply input terminal 54 connected to the converter 4.

The screen 9 also has a power supply terminal 94 connected to the output of the converter 4, which allows the screen 9 to be powered.

The processing unit 5 can thus start up and consequently make it possible to drive the variable speed drive control system 7 by virtue of the connection between the terminal 53 of the unit 5 and the terminal 75 of the variable speed drive control system 7. The variable speed drive control system 7 makes it possible to control the associated variable speed drive or drives according to instructions received from the processing unit, and by using the electrical power supplied by the power line L27.

The processing unit 5 can drive the screen 9 by virtue of the connection between the terminal 59 of the unit 5 and the terminal 95 of the screen, and in particular drive the display on the screen of information circulating over a CAN bus referenced 1589.

Thus, in this configuration of the electronic system of FIG. 6 which follows the closing of the start-up device 3, the power line L34 is powered up (as is the line L27, already powered up) and the processing unit 5 is woken up and initialized, while the screen 9 displays the initialization progress.

Moreover, and as explained hereinbelow, the connection of the terminal 222 of 22 to the terminal 52 of the processing unit 5 allows the processing unit 5 to detect a voltage at this terminal 52 (corresponding to the output voltage of the converter 4) and deduce therefrom that the battery cut-off device 2 is closed, the terminal 221 of the switch system 22 being linked to the output of the converter 4 (see FIG. 3).

Similarly, the connection of the terminal 322 to the terminal 53 allows the unit to detect the state of closure of the start-up device 3.

Controlled Closing of the Controllable Opening and Closing Device

In the configuration illustrated in FIG. 7, which follows the state of the electronic system described in FIG. 6, the processing unit 5 activates the controllable opening and closing device 6 which switches to the closed position. The controllable opening and closing device 6 thus allows current to pass between the battery 1 and the converter 4, such that the power line L64 which links the battery 1, the controllable opening and closing device 6 and the converter 4 is also powered up.

This controllable opening and closing device 6 makes it possible to maintain the power supply of the voltage converter 4 and therefore of the components which are powered by the converter 4, such as the processing unit 5, even when the start-up device 3 or the battery cut-off device 2 is open. Indeed, the power line L64 can take over from the power line L34.

To sum up, in the configuration of FIG. 7, the initialization of the processing unit 5 has proceeded correctly and the processing unit 5 has activated the controllable opening and closing device 6. The power lines L27, L34, L64 which respectively power the control system 7 by the battery cut-off device 2, and the converter 4 by the start-up device 3, and the converter 4 by the controllable opening and closing device 6 are powered up. The machine is ready to be used. In particular, the user can actuate one or more of the members of a control station to control the movement of the arm and/or of the machine, the processing unit driving the variable speed drive control system 7 according to signals received from said member or members of the control station.

Opening of the Start-Up Device, the Battery Cut-Off Device Remaining Closed

Figure 8:
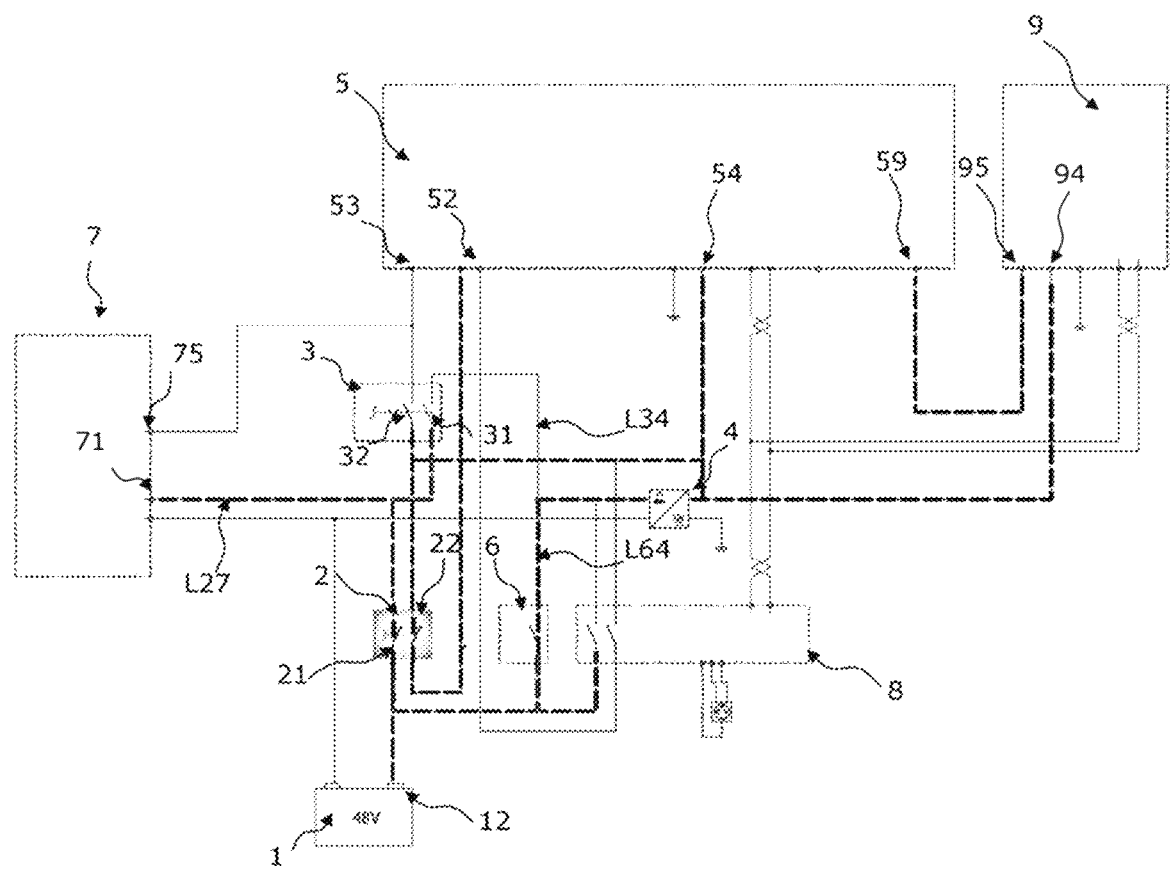
FIG. 8 illustrates a fifth state of operation of the electronic system of FIG. 3.

In the configuration of operation illustrated in FIG. 8, which follows the state described in FIG. 7, the start-up device 3 has switched to the open position (the user for example having finished using the machine), while the battery cut-off device 2 is still in the closed position.

The start-up device 3 then no longer transmits the power supply voltage from the battery 1 to the converter 4, but the converter 4 nevertheless remains powered by the battery 1 via the controllable opening and closing device 6 which is closed.

Thus, the processing unit 5 and the screen 9 continue to be powered by the output voltage of the converter 4. Because the battery cut-off device 2 is not yet in the open position, the variable speed drive control system 7 remains powered up via the closed battery cut-off device 2 and linked to the battery 1.

The processing unit 5 detects, at the terminal 53 linked to the terminal 322 of the switch system 32 of the start-up device 3, the fact that the start-up device 3 is open, such that the processing unit 5 no longer drives the variable speed drive control system 7. Thus, any commands to move the machine and/or the arm from control members of the machine are no longer transmitted to the variable speed drive control system 7.

The processing unit 5 is prepared to be switched off, the controllable opening and closing device 6 making it possible to maintain the power supply of the processing unit 5, for the time it takes for the processing unit 5 to perform the requisite operation or operations, notably data saving operations, for a clean switch-off.

Opening of the Battery Cut-Off Device

Figure 9:
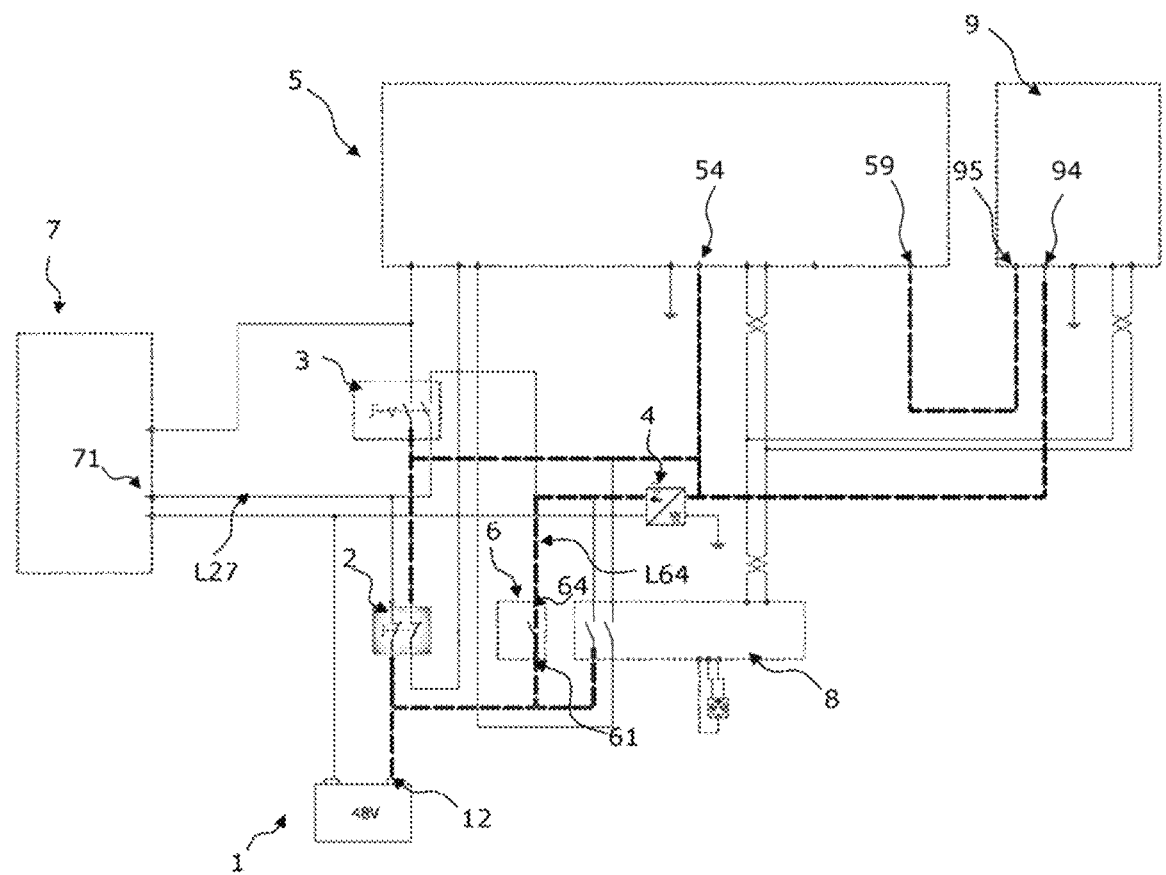
FIG. 9 illustrates a sixth state of operation of the electronic system of FIG. 3.

In the mode of operation illustrated in FIG. 9, which follows the state of operation described in FIG. 8, the user brings the battery cut-off device 2 into the open position. The variable speed drive control system 7 is no longer powered.

The converter 4 remains powered by the battery 1 by virtue of the controllable opening and closing device 6 whose terminal 61 is connected to the battery 1 so as to form the power line L64, the power supply of which is not affected by the open state of the battery cut-off device 2.

The processing unit 5 which remains powered by the converter 4 can thus, if necessary, continue its preparation to be switched off.

Then, the processing unit 5 can be switched off cleanly by commanding the opening of the controllable opening and closing device 6, which cuts the power supply of the converter 4. The electronic system then reverts to the configuration of FIG. 4.

II. Mode of Operation with Charger when the Machine is in the Off State

Connection of the Charger

Figure 10:
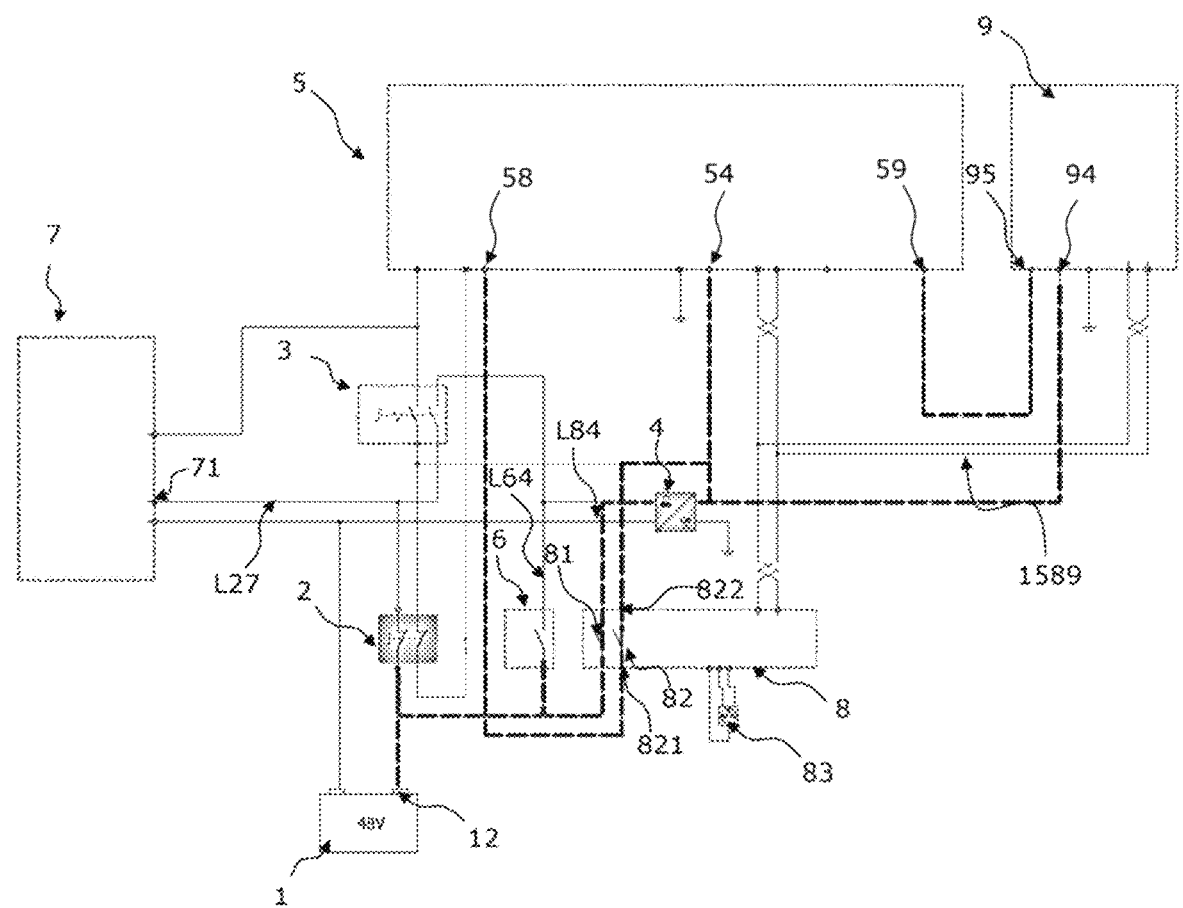
FIG. 10 illustrates a seventh state of operation of the electronic system of FIG. 3.

In the mode of operation illustrated in FIG. 10, which follows the state described in FIG. 4 for which the battery cut-off device 2, the start-up device 3 and the controllable opening and closing device 6 are in the open position, the user has connected the plug 83 of the charger to the mains such that the charger is electrically powered. In other words, in this configuration in which the electronic system of the machine is initially off, the connection of the charger allows the electronic system to detect this connection, and more particularly detect the powering of the charger.

The charger 8 comprises a processing unit which automatically commands the closing of the controllable opening and closing systems 81, 82 when the charger is electrically powered by being connected to the mains.

The closing of the controllable opening and closing system 82 which comprises the terminal 822 connected to the input of the converter 4 and a terminal 821 connected to the positive terminal 12 of the battery (upstream of the battery cut-off device 2 and of the controllable opening and closing device 6) makes it possible to benefit from an additional power line L84 to power the converter 4 via the controllable opening and closing system 82 of the charger 8 when the charger 8 is in the connected state.

The converter 4 in turn powers the processing unit 5 (and the display screen 9) which is woken up and which detects that the charger 8 is connected by detecting a voltage at its terminal 58 which corresponds to the output voltage of the converter.

As illustrated in FIG. 10, the terminal 58 of the unit 5 is connected to the terminal 821 of the controllable opening and closing system 82 of the charger and the other terminal 822 of the controllable opening and closing system 82 is connected to the output of the converter 4, such that the closing of the controllable opening and closing system 82 which results from the connection of the charger 8 brings a voltage to the terminal 58 which is detected by the processing unit 5.

The screen 9 displays the initialization progress. The power line L27 of the control system 7, and the power line L64 connected to the converter 4 remain powered down. The charging has not yet begun.

Figure 11:
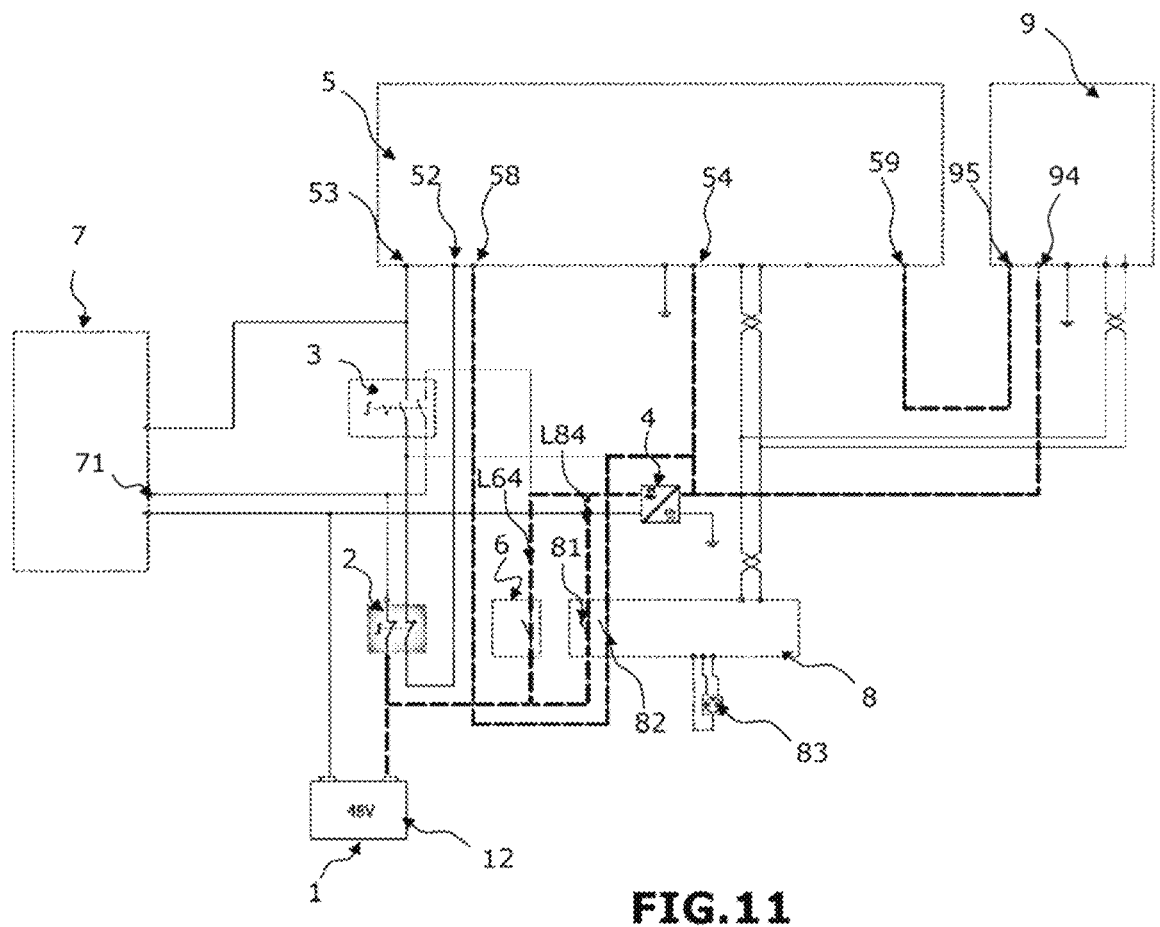
FIG. 11 illustrates an eighth state of operation of the electronic system of FIG. 3.

When the initialization of the processing unit 5 has been correctly completed, the processing unit 5 commands the closing of the controllable opening and closing device 6 as illustrated in FIG. 11 to activate the power line L64, which makes it possible to maintain the powering of the converter 4 in the event of disconnection of the charger 8. The charging of the battery 1 can begin. To this end, the processing unit 5 transmits, to the charger via the CAN bus 1598, a signal to the charger 8 to trigger the charging of the battery 1.

Disconnection or Cutting of the Power Supply of the Charger

When the charger 8 is disconnected or undergoes a cutting of the power supply from the network to which it remains connected, the controllable opening and closing systems 81 and 82 open such that the power line L84 is no longer powered up, but the converter remains powered by the power line L64 such that the converter 4 can continue to power the processing unit 5 and the screen 9. The system is then back in a state corresponding to that of FIG. 9.

The opening of the controllable opening and closing system 81 which results from the stopping of the power supply to the charger 8 allows the processing unit 5 to detect the absence of voltage at the terminal 58 and detect an operation preparatory to switching off as detailed hereinbelow.

Thus, the closed state of the controllable opening and closing device 6 makes it possible to maintain the powering of the processing unit 5 which can drive the display on the screen of information relating to the state of use of the machine and notably the fact that the charger 8 has been disconnected, for example to alert the user.

The processing unit 5 performs its operations preparatory to powering down (including the backing up of data such as the information relating to the disconnection of the charger).

As explained previously, once the operation preparatory to switching off has been completed, the unit 5 commands the opening of the controllable opening and closing device 6, which allows the electronic system of the machine to switch off cleanly and revert to the configuration of FIG. 4.

III. Mode of Operation with Charger when the Machine is in the on State

Connection of the Charger

Figure 12:
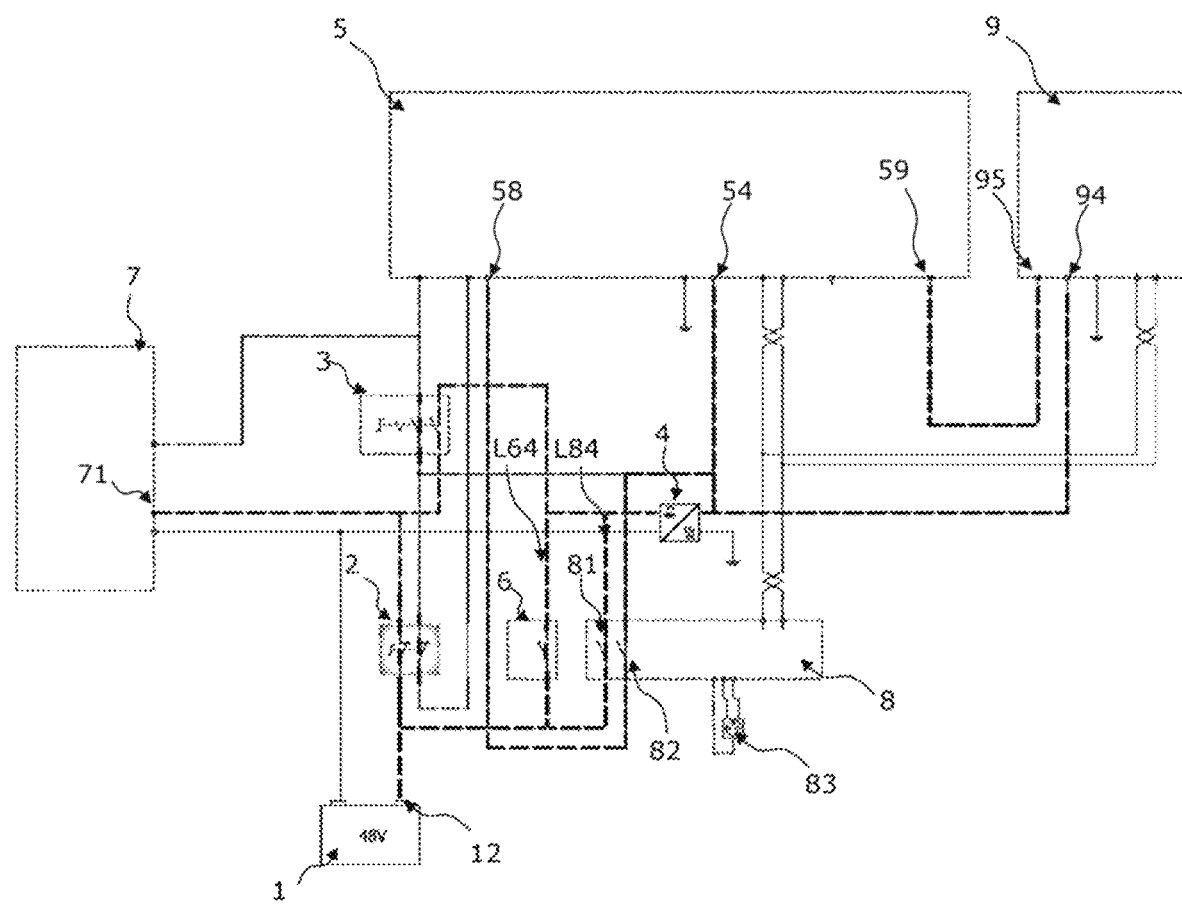
FIG. 12 illustrates a ninth state of operation of the electronic system of FIG. 3.

When the handling machine is on so that it can operate, the circuit-breaker device 2, the start-up device 3 and the controllable opening and closing device 6 being in the closed position (which corresponds to the configuration of FIG. 7), the event corresponding to a connection of the charger 8 in such a configuration is managed as follows with reference to FIG. 12.

The charger 8 is electrically powered via its plug 83 which is connected to the mains. The powering of the charger 8 causes the closing of the controllable opening and closing systems 81, 82 as illustrated by the dotted lines in FIG. 12, such that the processing unit 5 detects the connection of the charger 8 via the controllable opening and closing of the system 82, the closing of which brings the output voltage of the converter 4 to the terminal 58 of the processing unit 5.

The processing unit 5 detects also that the battery cut-off device 2 and the start-up device 3 are closed by detecting, respectively, the output voltage of 4 on the terminals 52 and 53 of the processing unit. The processing unit 5 is configured to prevent the use of the machine as long as the battery cut-off device 2 and the start-up device 3 remain closed.

The processing unit 5 can thus prevent the transmission to the variable speed drive control system 7 of instructions corresponding to the manipulating of control members of the machine by the operator. The processing unit 5 can perform data saving operations to anticipate the opening of the battery cut-off device 2 and of the start-up device 3. The processing unit 5 alerts the operator, for example by driving the display of the screen 9, that the conditions to start charging are not fulfilled, because the battery cut-off device 2 and/or the start-up device 3 are in the closed position, and can prompt the operator to open the devices 2, 3 to be able to proceed with the charging.

Opening of the Battery Cut-Off Device and/or of the Start-Up Device

When only one of the battery cut-off and start-up devices 2, 3 is open, provision can be made for the processing unit 5 to continue to prevent the charger from charging the battery. As a variant, provision can be made for the opening of one of the battery cut-off and start-up devices 2, 3 to be considered as sufficient for the processing unit 5 to transmit over the bus 1589 a signal allowing the charger 8 to trigger the charging of the battery 1.

When the charger 8 is connected and the battery cut-off device 2 and the start-up device 3 have been brought to the open position, the configuration is then that as in FIG. 11 in which, despite the opening of the devices 2, 3, the unit 5 and the screen 9 remain powered by the output of the converter 4 by virtue of the controllable opening and closing device 6 which is closed. The unit 5 detects, by the terminal 52, that the battery cut-off device 2 is open, and, by the terminal 53, that the start-up device 3 is also open. The conditions are fulfilled to authorize the charging of the battery and the unit 5 commands the charger 8 to proceed with the charging of the battery 1.

It should be noted that, with the controllable opening and closing device 6 remaining closed, the processing unit 5 remains powered in the battery charging process, which allows it to save information and alert the user if necessary for example via the screen.

In the event of disconnection of the charger, there is then a reversion to the configuration of FIG. 9 in which the processing unit 5 can save information relating to the charge, in particular to the disconnection, and inform the user of this disconnection. The processing unit 5 can prepare to switch off as explained hereinabove.

By virtue of the fact that a part of the machine electronic system is kept active while charging the battery using the controllable opening and closing device 6, such a design of the machine thus allows the processing unit 5 to:

- monitor and display the progress of the charging of a battery; and/or
- archive the operations performed and inform the user if an operation is performed which affects the charging of the battery, the fact that the processing unit is kept powered making it possible to store the state of progress of the charging of the battery and inform the user of the consequences of the action undertaken; and/or
- launch, interrupt, resume a normal charge, an equalizing charge, a regeneration charge, a maintaining phase; and/or
- prevent an abrupt interruption of powering of the processing unit of the machine; and/or
- prevent the starting of a battery charging process without the appropriate conditions being fulfilled.

The disclosure is not limited to the embodiments illustrated in the drawings.

Furthermore, the term "comprising" does not preclude other elements or steps. Furthermore, features or steps which have been described with reference to one of the embodiments explained above can also be used in combination with other features or steps of other embodiments explained above.

The invention claimed is:

1. A handling machine comprising:
    a variable speed drive control system configured to control at least one variable speed drive, the at least one variable speed drive being associated with one or more of a hydraulic pump electric motor and an electric motor for moving the handling machine with respect to the ground;
    a battery configured to power the variable speed drive control system;
    a processing unit configured to control the variable speed drive control system;
    a voltage converter configured to convert a voltage of the battery, the processing unit being connected to the voltage converter;
    a battery cut-off device connected to the battery, the variable speed drive control system, and the voltage converter, the battery cut-off device being configured to close and open a first battery power supply line of the variable speed drive control system and a second battery power supply line of the voltage converter;
    a start-up device connected to one or more of the voltage converter and the battery cut-off device;
    a charger configured to connect to an electrical power supply network to charge the battery; and
    an opening and closing device controllable by the processing unit, the opening and closing device being connected to the battery and to the voltage converter, wherein, when the opening and closing device is in a closed state and one or more of the start-up device and the battery cut-off device are in an open state, the processing unit is powered via the voltage converter.

2. The handling machine of claim 1, wherein
    the charger includes a first controllable opening and closing system configured to be in the open state when the charger is not electrically powered and the closed state when the charger is electrically powered, the first controllable opening and closing system being connected to the battery and to the voltage converter, and
    when the charger is in the closed state, the battery powers the voltage converter via the first controllable opening and closing system, the voltage converter powers the processing unit, and the processing unit controls the opening and closing device.

3. The handling machine of claim 2, wherein, when the opening and closing device, a switch system of the battery cut-off device, and the first controllable opening and closing system of the charger are in the open state, the voltage converter and the variable speed drive control system are isolated from the battery.

4. The handling machine of claim 1, wherein the processing unit is configured to perform at least one operation preparatory to switching off the processing unit when the processing unit is powered by the voltage converter and the start-up device or the battery cut-off device switches from the closed state to the open state.

5. The handling machine of claim 1, wherein the processing unit is configured to generate a signal to charge the battery via the charger when one or more of the battery cut-off device or the start-up device is in the open state, and the charger is powered.

6. The handling machine of claim 1, wherein the processing unit is configured to detect whether the charger is no longer powered and, if the processing unit detects that the charger is no longer powered, the processing unit is configured to:
    execute at least one operation preparatory to switching off the processing unit, and
    cause the opening and closing device to be in the open state.

7. The handling machine of claim 6, wherein the processing unit is configured to not operate the variable speed drive control system when the charger is powered.

8. The handling machine of claim 6, wherein the at least one operation preparatory to switching off the processing unit includes an operation to back up information relating to the charger no longer being powered.

9. The handling machine of claim 8, wherein the at least one operation preparatory to switching off the processing unit includes displaying on a screen the information relating to the charger no longer being powered.

10. The handling machine of claim 1, wherein the battery cut-off device is manually actuatable.

11. The handling machine of claim 1, wherein
    the battery cut-off device includes a switch system configured to have the open state and the closed state,
    the switch system has a first terminal and a second terminal, the first terminal is connected to the battery, the second terminal is connected to a first power supply input of the variable speed drive control system and to a second power supply input of the voltage converter, when the switch system is in the closed state, power is supplied from the battery to the variable speed drive control system and to the voltage converter, and when the switch system is in the open state, power is not supplied from the battery to the variable speed drive control system and power is not supplied from the battery to the voltage converter.

12. The handling machine of claim 1, wherein one or more of the battery cut-off device and the start-up device includes a switch system configured to have the open state and the closed state and includes a first terminal connected to a second terminal of the processing unit, and the processing unit is configured to detect the closed state or the open state of one or more of the battery cut-off device or the start-up device.

13. The handling machine of claim 1, further comprising a display screen in communication with the processing unit.

14. The handling machine of claim 2, wherein the charger includes a second controllable opening and closing system configured to have the open state in the absence of powering of the charger by the electrical power supply network and the closed state when the charger is powered, the second controllable opening and closing system including a first terminal connected to an output of the voltage converter and a second terminal connected to a third terminal of the processing unit to detect whether the charger is powered.

15. The handling machine of claim 14, wherein the processing unit is a first processing unit, the charger includes a second processing unit configured to, when the charger is powered, cause one or more of the first controllable opening and closing system and the second controllable opening and closing system to be in the closed state, and one or more of the first controllable opening and closing system and the second controllable opening and closing system is configured to revert to the open state when the charger is not powered.

16. A method for managing a charge of a battery of the handling machine according to claim 1, the handling machine further including a charger, a processing unit, and a controllable opening and closing device, the method comprising:

connecting a plug of the charger to an electrical power supply network to power the charger;

starting the processing unit;

commanding the controllable opening and closing device to close via the processing unit;

charging the battery via the charger;

detecting whether the charger is no longer powered via the processing unit;

executing at least one operation preparatory to switching off the processing unit; and commanding the controllable opening and closing device to open via the processing unit.

17. A handling machine comprising:

a variable speed drive control system configured to control a variable speed drive;

a battery configured to power the variable speed drive control system;

a voltage converter configured to convert a voltage of the battery;

a battery cut-off device configured to selectively connect the variable speed drive control system and the battery;

a start-up device configured to selectively connect the voltage converter and the battery cut-off device;

a charger connectable to an electrical power supply network to charge the battery;

an opening and closing device configured to selectively connect the battery and the voltage converter;

a processing unit configured to control the variable speed drive control system and the opening and closing device; and wherein the voltage converter is connected to the processing unit, and the voltage converter powers the processing unit when the opening and closing device connects the battery to the voltage converter.

18. The handling machine of claim 17, wherein the processing unit is configured to detect whether the charger is connected to the electrical power supply network and, if the processing unit detects that the charger is connected to the electrical power supply network, the processing unit is configured to:

execute at least one operation preparatory to switching off the processing unit, and disconnect the battery and the voltage converter via the opening and closing device.

19. The handling machine of claim 17, wherein;

the voltage is a first voltage, the battery supplies power to the variable speed drive and the voltage converter at the first voltage, the voltage converter converts the first voltage to a second voltage, the voltage converter supplies power to the processing unit at the second voltage, and the processing unit controls the variable speed drive.

* * * * *